(12) United States Patent
Chen et al.

(10) Patent No.: US 8,388,274 B2
(45) Date of Patent: Mar. 5, 2013

(54) ROUND CUTTING INSERT WITH ASYMMETRIC CHIPBREAKER FEATURE

(75) Inventors: Shi Chen, North Huntingdon, PA (US); Nicholas Joseph Henry, Latrobe, PA (US); Kent Peter Mizgalski, Stahlstown, PA (US); David Charles Johnston, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 602 days.

(21) Appl. No.: 12/683,427

(22) Filed: Jan. 6, 2010

(65) Prior Publication Data
US 2011/0164934 A1 Jul. 7, 2011

(51) Int. Cl.
*B23B 27/00* (2006.01)
*B23B 27/16* (2006.01)

(52) U.S. Cl. .................................. 407/113; 407/114
(58) Field of Classification Search ............ 407/113, 407/114, 115, 116
See application file for complete search history.

(56) References Cited

U.S. PATENT DOCUMENTS

| | | | |
|---|---|---|---|
| 5,205,680 A | | 4/1993 | Lindstedt |
| 5,695,303 A | * | 12/1997 | Boianjiu et al. .............. 407/114 |
| 5,743,681 A | * | 4/1998 | Wiman et al. .................. 407/114 |
| 5,934,844 A | * | 8/1999 | Woolley ........................ 407/114 |
| 6,079,912 A | * | 6/2000 | Rothballer ..................... 407/114 |
| 6,123,488 A | * | 9/2000 | Kasperik et al. .............. 407/113 |
| 6,234,724 B1 | * | 5/2001 | Satran et al. ..................... 407/43 |
| 6,692,199 B2 | | 2/2004 | Andersson et al. |
| 7,198,437 B2 | | 4/2007 | Jonsson |
| 7,381,015 B2 | * | 6/2008 | Jonsson ........................ 407/116 |
| 7,458,753 B1 | * | 12/2008 | Niebauer et al. .............. 407/113 |
| 7,534,075 B2 | * | 5/2009 | Kress et al. ..................... 407/66 |
| 7,607,867 B2 | * | 10/2009 | Benson ......................... 407/102 |
| 7,677,145 B2 | * | 3/2010 | Grund et al. .................... 82/1.11 |
| D640,717 S | * | 6/2011 | Morrison et al. ............ D15/139 |
| D658,218 S | * | 4/2012 | Morrison et al. ............ D15/139 |

FOREIGN PATENT DOCUMENTS

| | | |
|---|---|---|
| JP | 06-023603 A | 2/1994 |
| KR | 10-0481245 B1 | 4/2005 |
| KR | 10-2007-0015104 A | 2/2007 |
| WO | 2005-039805 A1 | 5/2005 |

* cited by examiner

*Primary Examiner* — Will Fridie, Jr.
(74) *Attorney, Agent, or Firm* — Larry R. Meenan, Esq.

(57) ABSTRACT

A round cutting insert includes a top surface, a clearance side surface and a bottom surface. The top surface includes an asymmetric chipbreaker feature adjacent a cutting edge that includes a finishing portion, a roughing portion, and a transition portion. The asymmetric chipbreaker feature includes a first rake face extending from the cutting edge, a second rake face between a bottom face and the first rake face, and a back face between a central island and the bottom face. The second rake face and the back face are sinusoidal waveforms with different periods to cause the distances from the cutting edge to the second rake face and back face to vary. The first and second rake faces are formed at different rake angles to provide effective chip control during machining operations.

19 Claims, 10 Drawing Sheets

ROUND CUTTING INSERT WITH ASYMMETRIC CHIPBREAKER FEATURE

BACKGROUND OF THE INVENTION

Round cutting inserts may often manage a number of profiling operations from fine machining to rough machining. Usually, the round cutting inserts generate a fine surface also in connection with high feed rates because the round edge functions as a wiper.

Contour/profile-turning machining operations present a unique problem due to continuously changing cutting conditions, and the associated wide variations in chip flow and the consequent chip form and surface finish issues due to geometric variations along the length of cut. The chip control may easily become deficient, especially in connection with small cutting depths when relatively wide and thin chips are formed that could be hard to break. As a result, long curled chips are formed that at worst may entangle around the insert holder and scratch the generated surface and possibly cause insert breakdown.

Unfortunately, in many contour/profile-turning cases, a round insert is the only option due to the exclusive shape of the workpiece. Unlike other insert styles, (e.g. C-shaped: 80 degree nose angle, or D-shaped: 55 degree nose angle), the round insert allows the use of any part of the cutting edge (i.e. 360 degree nose angle) to engage the workpiece during the machining process.

Currently, conventional round cutting inserts have the same chipbreaker feature along the entire 360 degree cutting edge. However, due to an insufficient understanding of the contour/profile-turning process and the distinctive geometry feature of the round insert, the currently available round insert chipbreaker feature is not efficiently designed to properly control and break chips. As a result, the conventional round insert is designed for only two types of machining operations: 1) a roughing process with a large depth of cut and high feed rates, and 2) a finishing process with a small depth of cut and slow feed rates.

Thus, there is a need to provide a single round insert with improved chip control that provides the capability to perform both a roughing machining operation with large depths of cut at any desired feed rate, and a finishing machining operation with small depths of cut at any desired feed rate.

BRIEF SUMMARY OF THE INVENTION

Briefly, according to the invention, there is provided a round cutting insert comprising a bottom surface; a clearance side surface; and a top surface defining a cutting edge at an intersection between the clearance side surface and the top surface. The top surface includes an asymmetric chipbreaker feature proximate the cutting edge. The asymmetric chipbreaker feature includes a finishing portion, a roughing portion, and a transition portion located between the finishing portion and the roughing portion.

In another embodiment, a round cutting insert comprises a bottom surface; a clearance side surface; and a top surface defining a cutting edge at an intersection between the clearance side surface and the top surface. The top surface includes an asymmetric chipbreaker feature proximate the cutting edge. The asymmetric chipbreaker feature comprises a first rake face, a second rake face, a bottom face and a back face. The first rake face extends radially inward from the cutting edge to the second rack face and is formed at a first rake angle with respect to a plane perpendicular to a central axis of the cutting insert. The second rake face extends radially inward from the first rake face to the bottom face and is formed at a second rake angle with respect to the plane of the cutting insert. The bottom face extends radially inward from the second rake face to the back face and is formed at a third angle with respect to the plane of the cutting insert. The back face extends radially inward from the bottom face to a central island and is formed at a fourth angle with respect to the plane of the cutting insert. A distance from the cutting edge to the second rake face is a sinusoidal variation with a first period, and a distance from the cutting edge to the back face is a sinusoidal variation with a second period larger than the first period.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
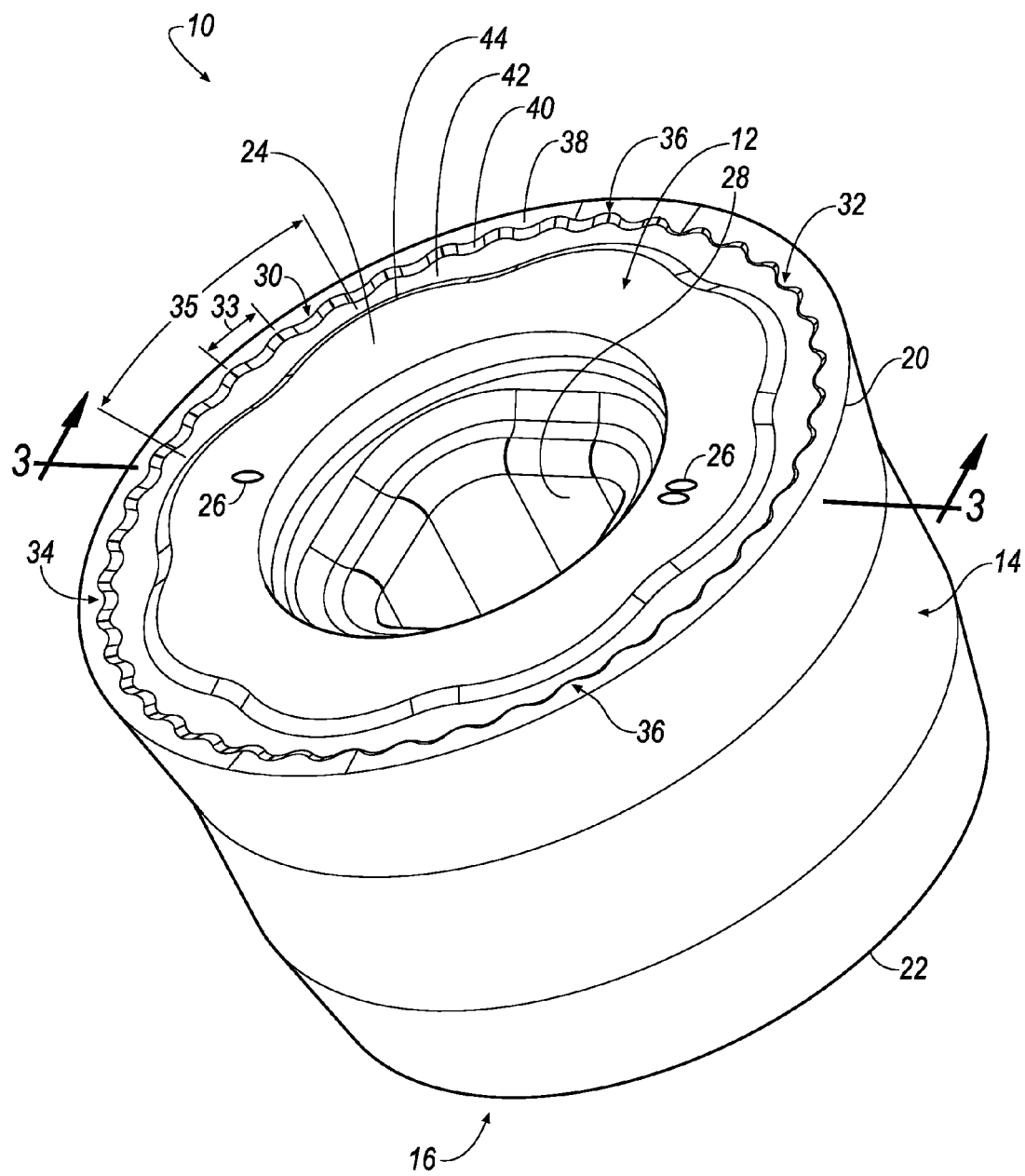
FIG. 1 is a perspective view of a round cutting insert with an asymmetric chipbreaker feature according to an embodiment of the invention.

Referring now to FIGS. 1-5, a round cutting insert according to an embodiment is shown generally at 10. The insert 10 generally comprises a top surface 12, a clearance side surface 14, a substantially planar bottom surface 16 and a central axis 17. The clearance side surface 14 forms a clearance angle 18 (FIG. 3) with respect to the top surface 12. In order to provide sufficient clearance for most applications, the clearance angle 18 is between about +3 degrees and about +17 degrees, preferably between about +8 degrees and about +12 degrees, and most preferably about +10 degrees. In one embodiment, the clearance angle 18 may be equal to zero degrees such that the clearance side surface 14 is substantially perpendicular to the top surface 12 (and to the bottom surface 16), thereby providing a double-sided insert.

Figure 2:
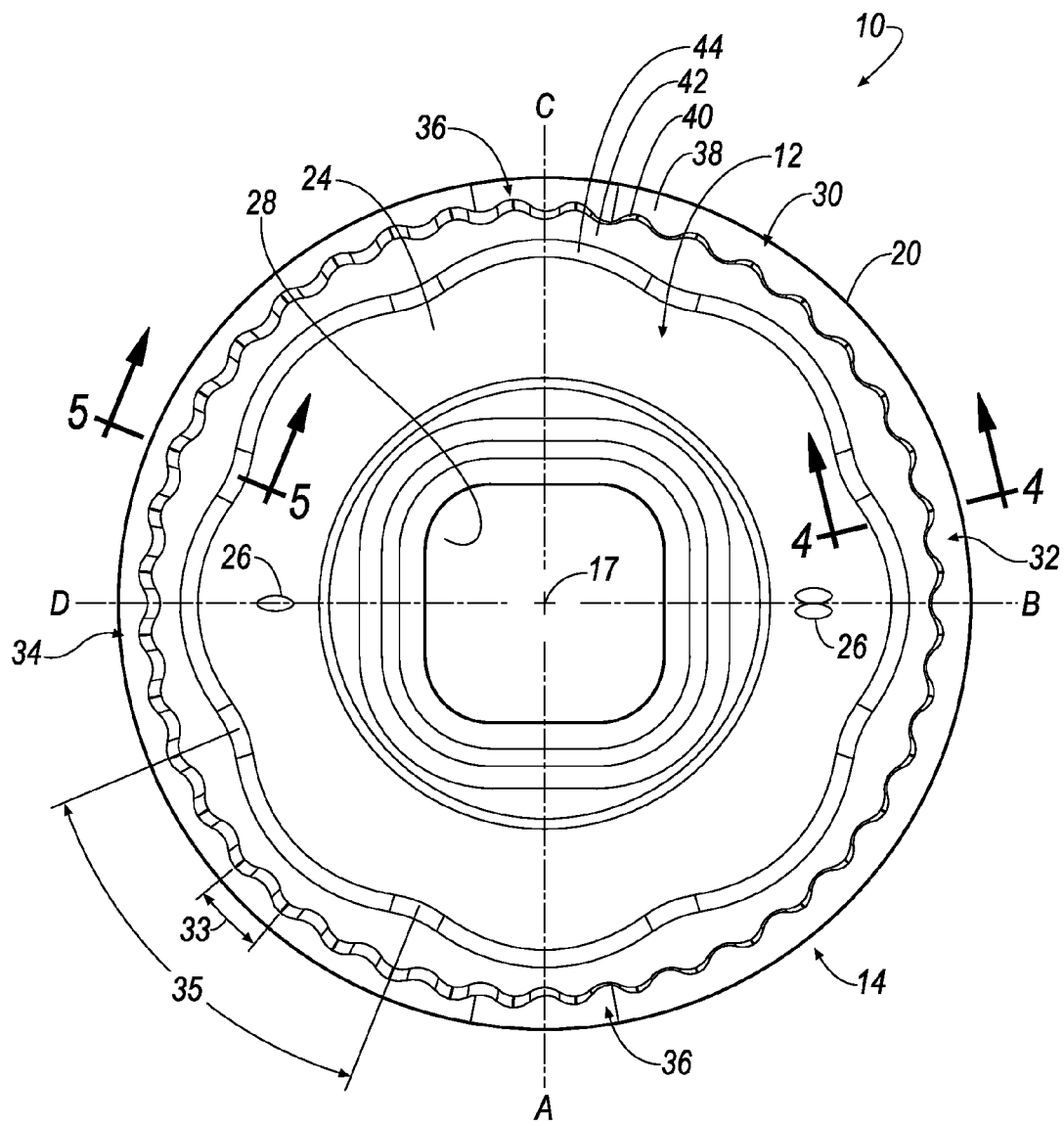
FIG. 2 is a top view of the round cutting insert of FIG. 1.
Figure 3:
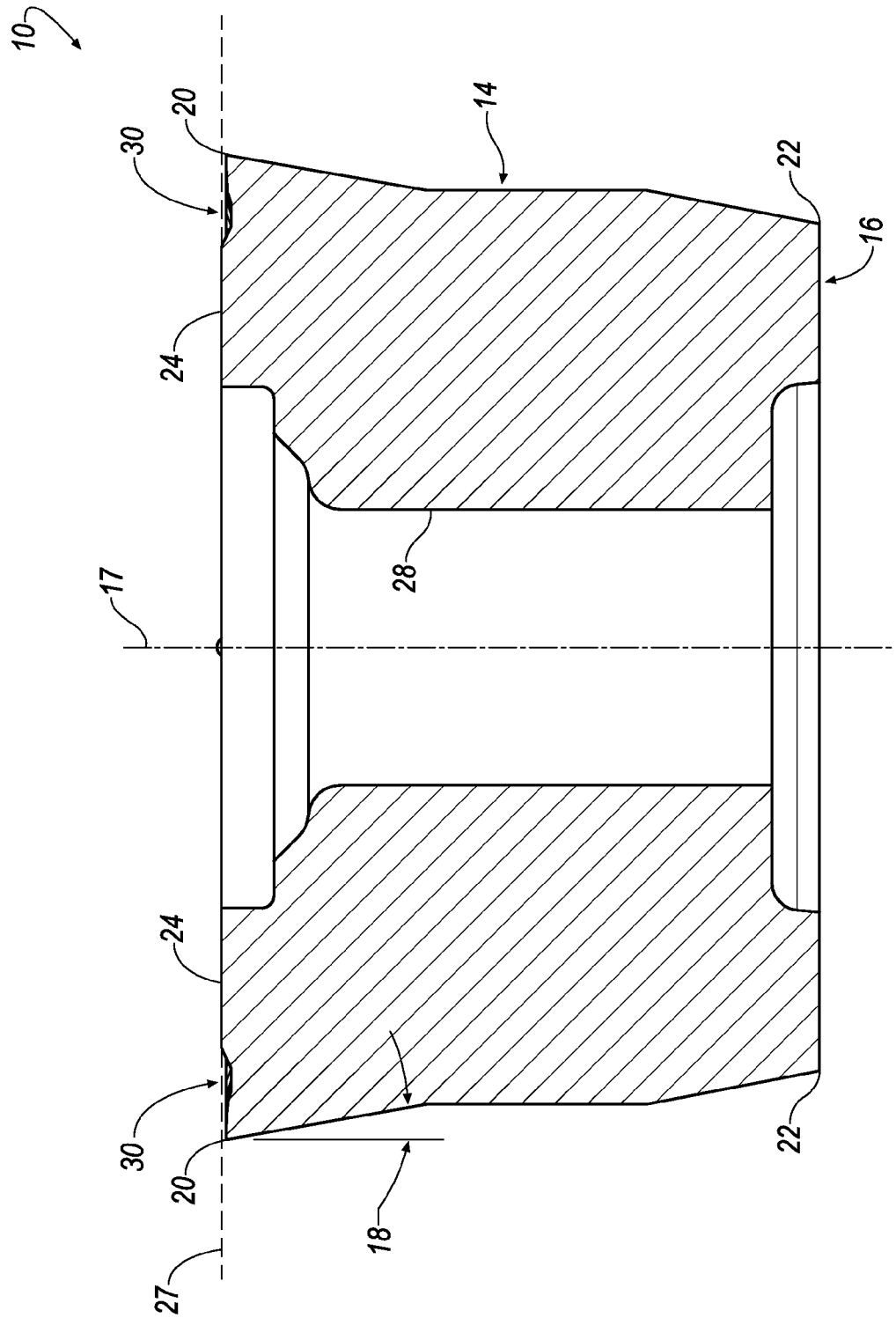
FIG. 3 is a cross-sectional view of the round cutting insert taken along line 3-3 of FIG. 1.

Referring now to FIGS. 1-3, the cutting insert 10 includes a substantially circular cutting edge 20 at the intersection between the top surface 12 and the clearance side surface 14 and a substantially circular bottom edge 22 at the intersection between the bottom surface 16 and the clearance side surface 14. In the illustrated embodiment, the clearance angle 18 is a positive value so that the diameter of the substantially circular cutting edge 20 is larger than the diameter of the circular bottom edge 22.

Figure 4:
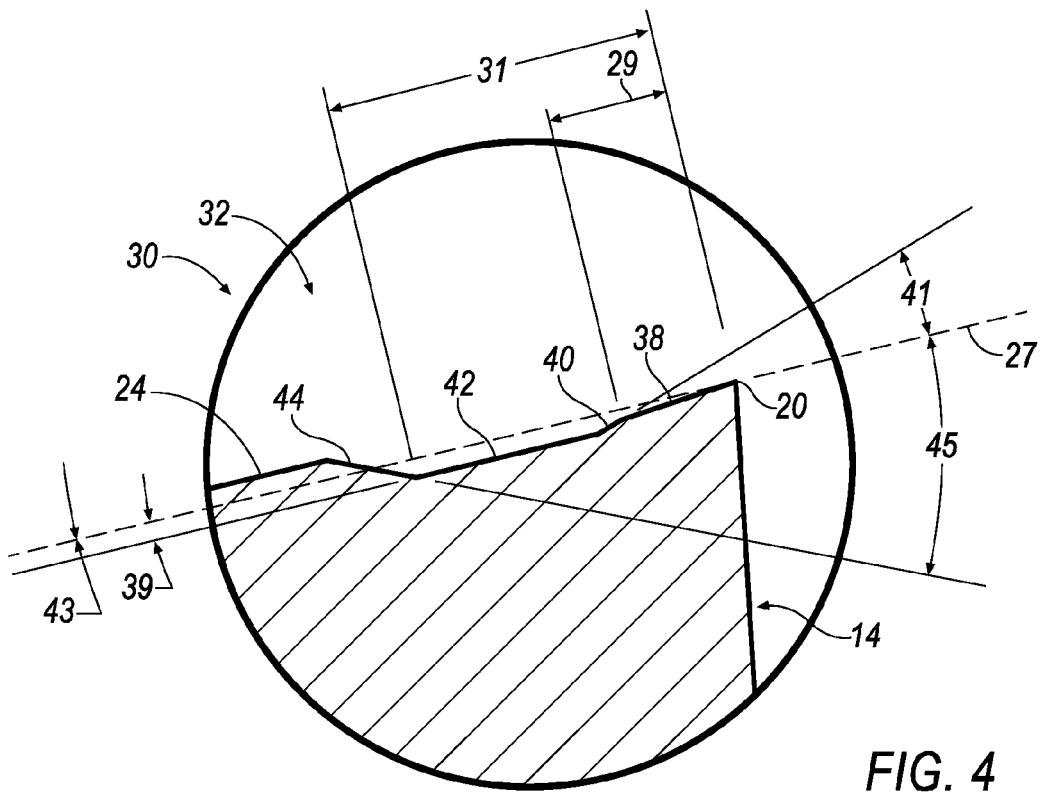
FIG. 4 is a cross-sectional view of the finishing portion of the asymmetric chipbreaker feature of the round cutting insert taken along line 4-4 of FIG. 2.
Figure 5:
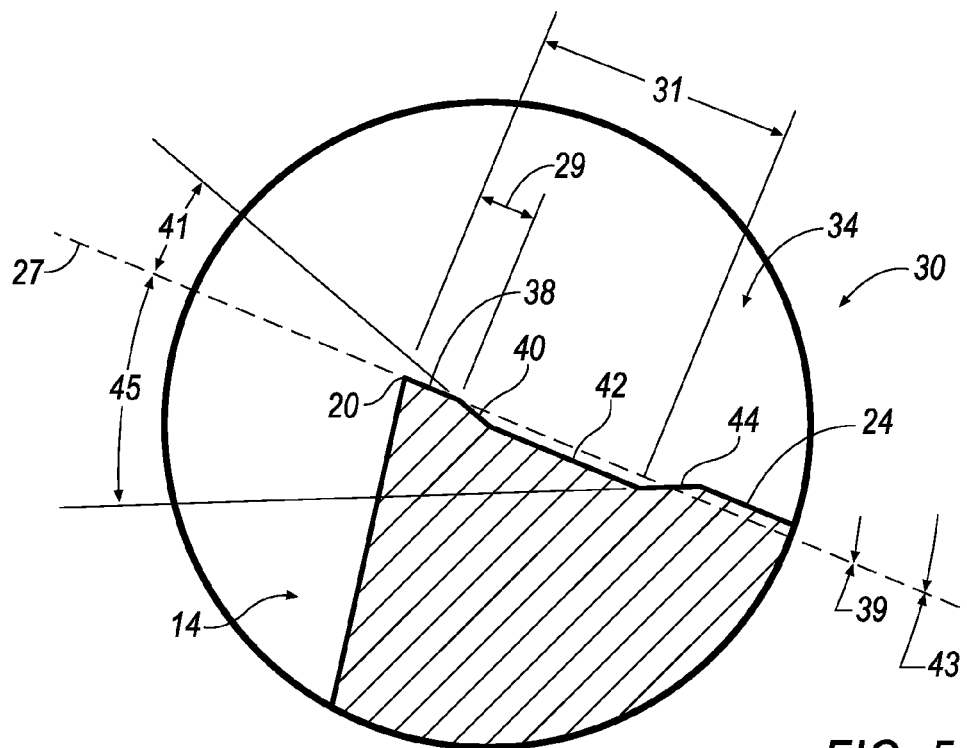
FIG. 5 is a cross-sectional view of the roughing portion of the asymmetric chipbreaker feature of the round cutting insert taken along line 5-5 of FIG. 2.
Figure 6:
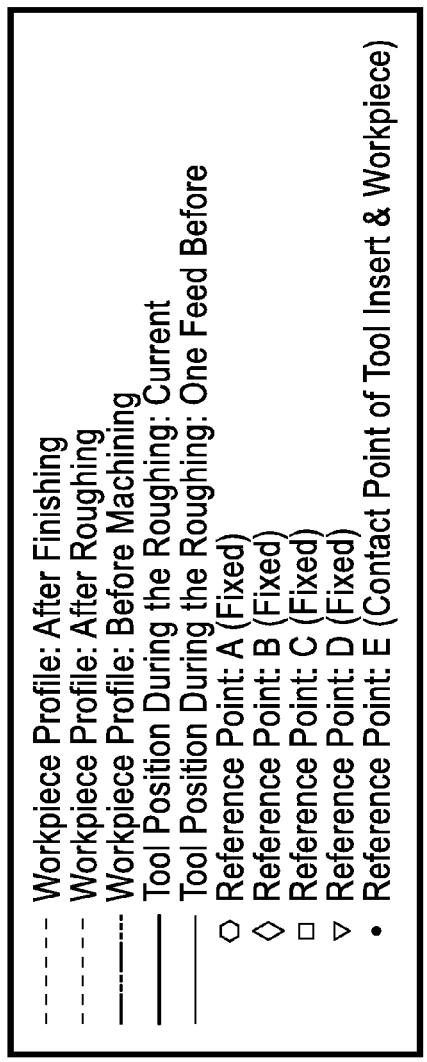
FIG. 6 is a plan view of the round cutting insert during different stages of a contour/profile turning roughing operation.
Figure 6:
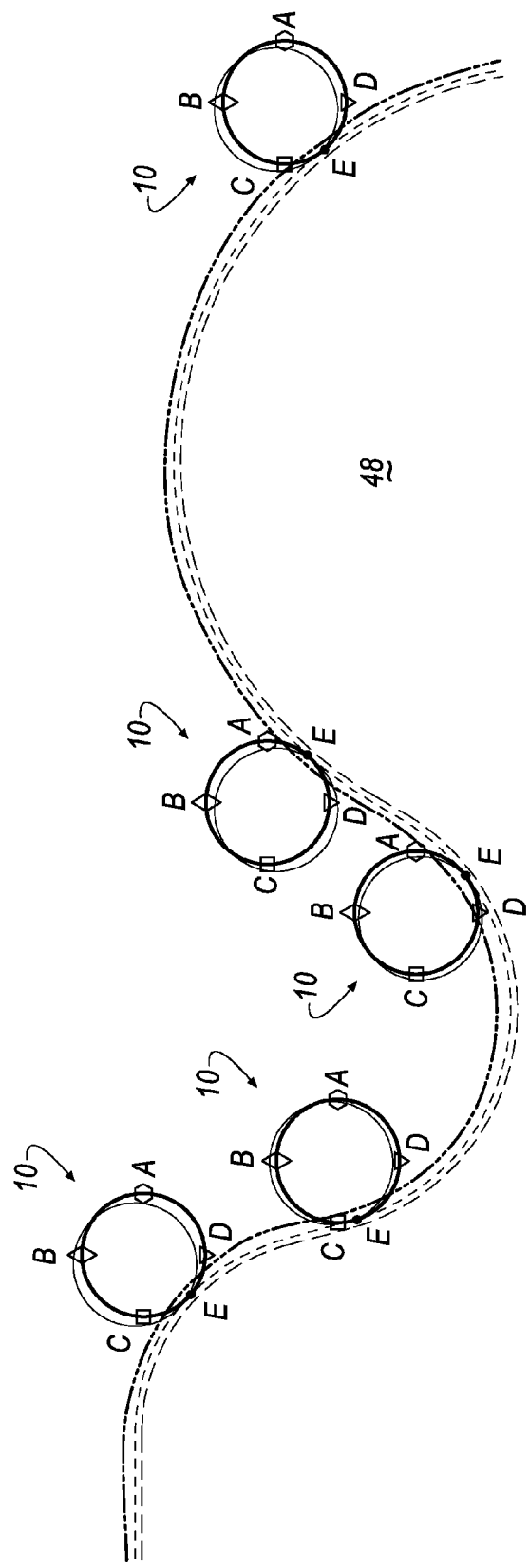
Figure 7:
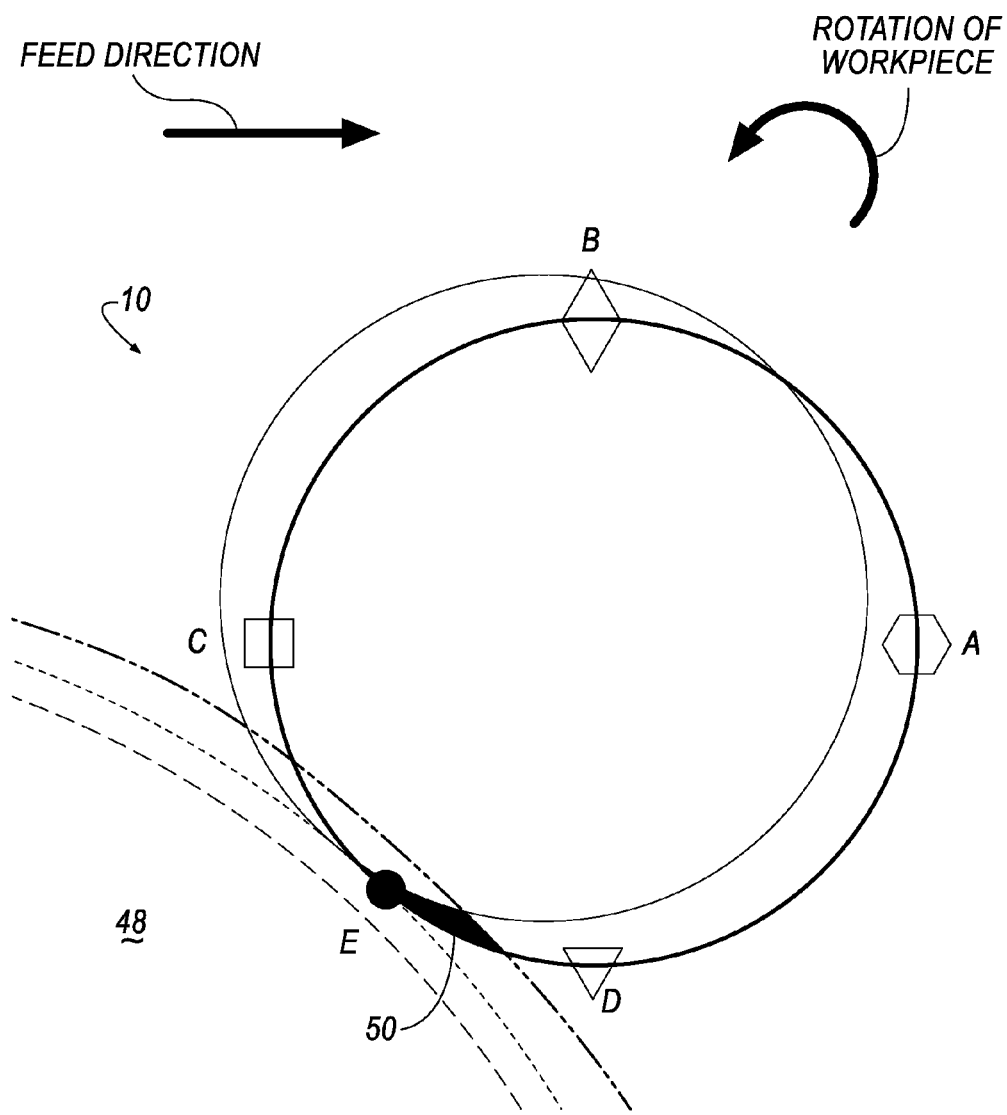
FIGS. 7-11 are enlarged views of the round cutting insert during different stages of a contour/profile turning roughing operation shown in FIG. 6.
Figure 8:
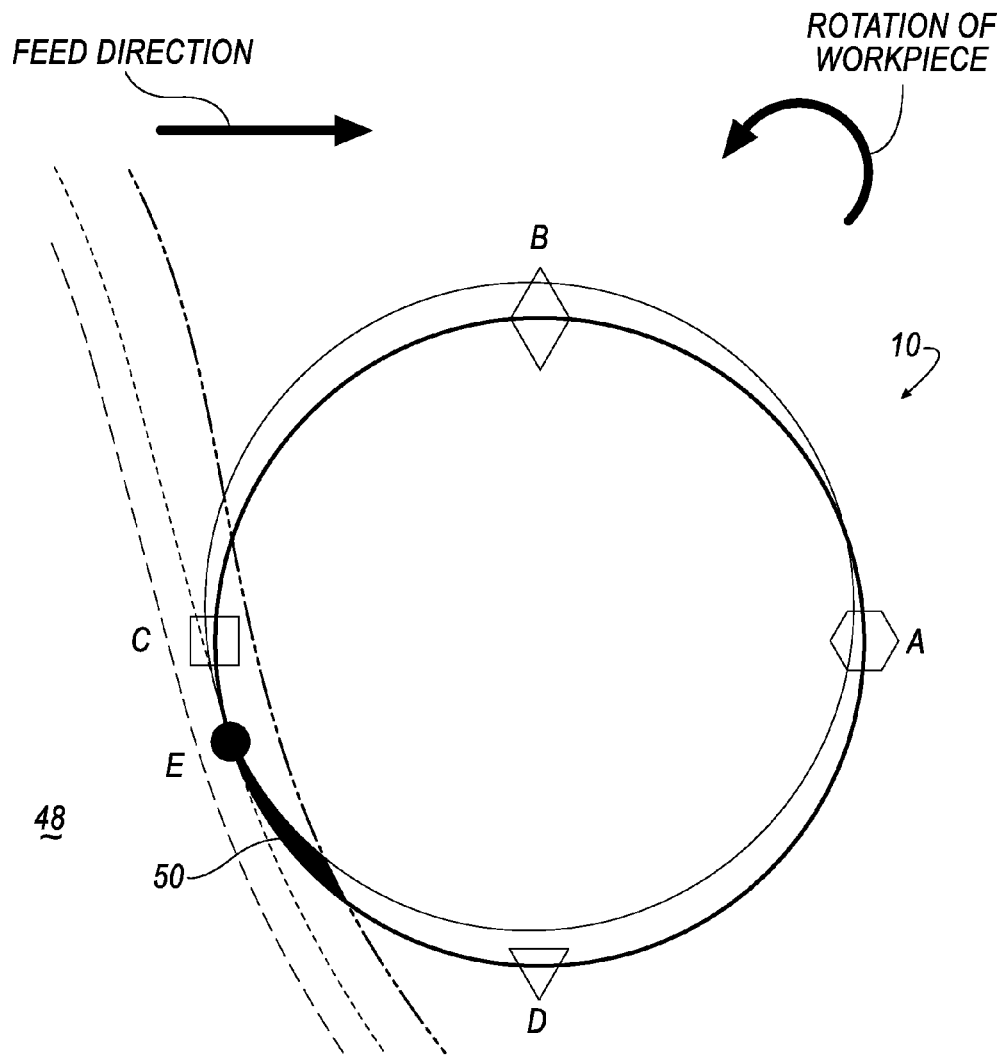
Figure 9:
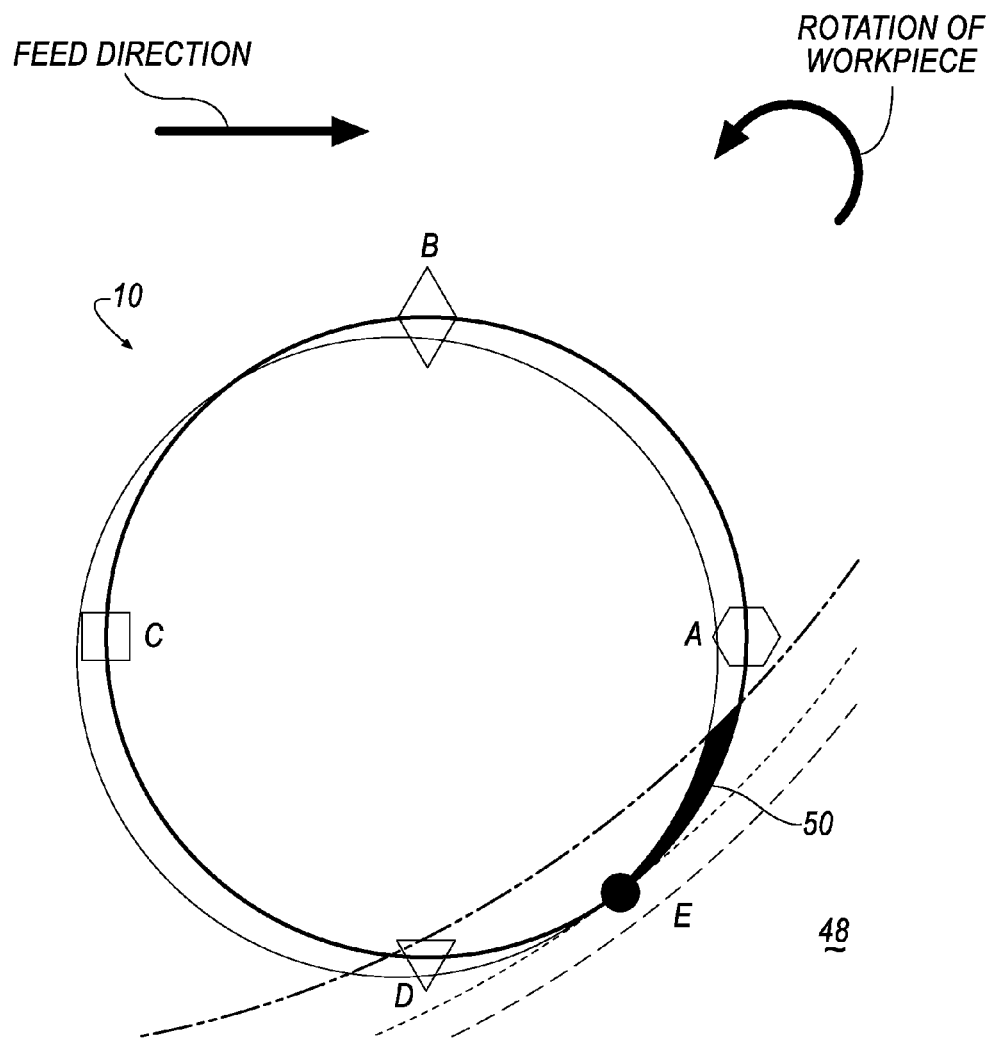
Figure 10:
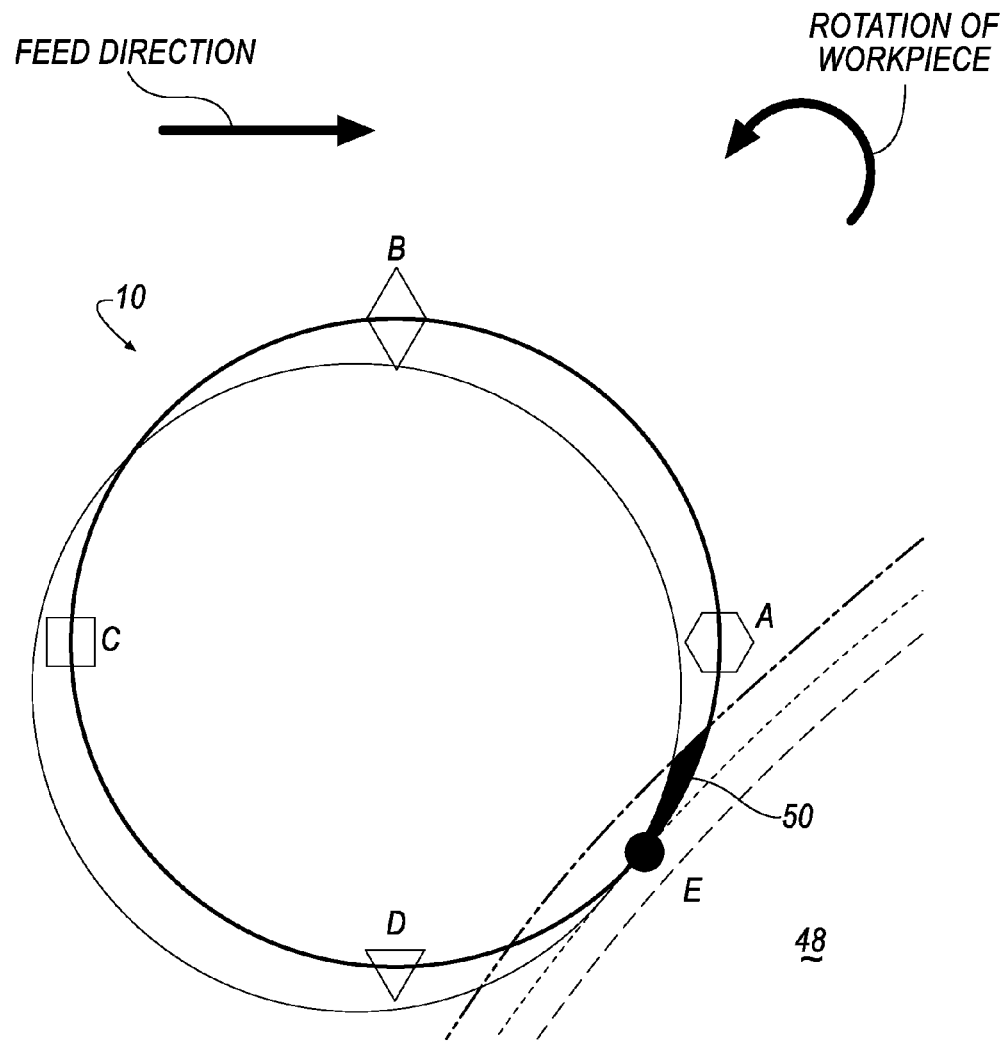
Figure 11:
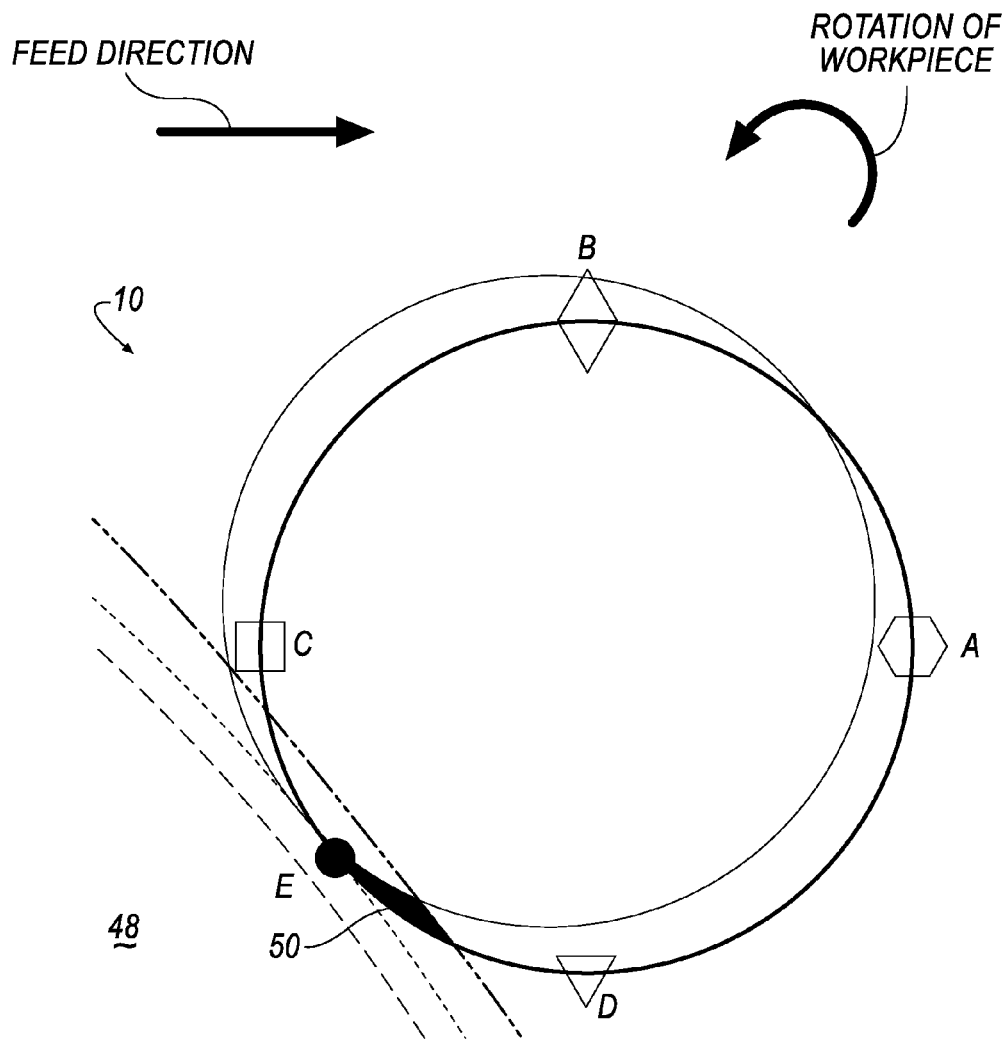

The top surface 12 includes a substantially planar central island 24 that may be slightly elevated with respect to the cutting edge 20, as shown in FIGS. 4 and 5. It will be appreciated that the island 24 may be lower in elevation with respect to the cutting edge 20 on negative inserts. As shown in FIG. 1, the island 24 includes one or more indexing marks 26 that may be similar in shape or different in shape. In the illustrated embodiment, the island 24 includes two indexing marks 26 that are different in shape that are circumferentially positioned at about 180 degrees apart from each other. One indexing mark 26 may be used to properly position the cutting insert 10 with respect to a toolholder (not shown) to perform a finishing machining operation, and the other indexing mark 26 may by used to properly position the cutting insert 10 with respect to a toolholder (not shown) to perform a roughing machining operation. The cutting insert 10 may also includes a countersunk bore 28 for mounting the insert 10 to a toolholder (not shown).

One aspect of the invention is that the top surface 12 includes an asymmetric chipbreaker feature, shown generally at 30, proximate the cutting edge 20. In general, the asymmetric chipbreaker feature 30 includes a finishing portion 32 for allowing the cutting insert 10 to perform a finishing machining operation, a roughing portion 34 for allowing the cutting insert 10 to perform a roughing machining operation, and a transition portion 36 located between the finishing portion 32 and the roughing portion 34.

As shown in FIGS. 4 and 5, the asymmetric chipbreaker feature 30 comprises a first rake face 38, a second rake face 40, a bottom face 42, and a back face 44. The first rake face 38 extends radially inward from the cutting edge 20 to the second rack face 40 and is formed at a first rake angle 39 with respect to a plane 27 that is substantially perpendicular to the central axis 17 of the cutting insert 10. In the illustrated embodiment, the rake angle 39 is smaller in the roughing portion 34 of the asymmetric chipbreaker feature 30 than in the finishing portion 32. For example, the rake angle 39 may be between about five (5) degrees and about ten (10) degrees in the finishing portion 32 of the cutting insert 10, and between about zero (0) degrees and about five (5) degrees in the roughing portion 34 of the asymmetric chipbreaker feature 30. In the illustrated embodiment, the rake angle 39 is about five (5) degrees in the finishing portion 32 and about zero (0) degrees in the roughing portion 34 of the cutting insert 10.

The second rake face 40 extends radially inward from the first rake face 38 to the bottom face 42 and is formed at a second rake angle 41 with respect to the plane 27 of the cutting insert 10. As shown in FIGS. 4 and 5, the second rake angle 41 is approximately the same in both the finishing portion 32 and the roughing portion 34 of the asymmetric chipbreaker feature 30. In one embodiment, the second rake angle 41 is between about fifteen (15) degrees and about twenty (20) degrees in both the finishing portion 32 and the roughing portion 34. In the illustrated embodiment, the second rake angle 41 is about eighteen (18) degrees.

In addition, a distance 29 from the cutting edge 20 to the second rake face 40 varies for both the finishing and roughing portions 32, 34 of the cutting insert 10. In the illustrated embodiment, the distance from the cutting edge 20 to the second rake face 40 varies between about 0.005 inches (0.127 mm) to about 0.020 inches (0.508 mm). It should be noted that the second rake face 40 is a sinusoidal waveform with a period 33 when viewed from the top of the cutting insert 10, as shown in FIG. 2. Thus, the distance 29 from the cutting edge 20 to the second rake face 40 is a sinusoidal variation.

The bottom face 42 extends radially inward from the second rake face 40 to the back face 44 and is formed at a third angle 43 with respect to the plane 27 of the cutting insert 10. As shown in FIGS. 4 and 5, the third angle 43 is approximately the same in both the finishing portion 32 and the roughing portion 34 of the asymmetric chipbreaker feature 30. In the illustrated embodiment, the bottom face 42 is substantially parallel to the plane 27, and therefore the third angle 43 is about zero (0) degrees.

The back face 44 extends radially inward from the bottom face 42 to the central island 24 and is formed at a fourth angle 45 with respect to the plane 27 of the cutting insert 10. The back face 44 provides for effective chip control. As shown in FIGS. 4 and 5, the fourth angle 45 is approximately the same in both the finishing portion 32 and the roughing portion 34 of the asymmetric chipbreaker feature 30. For example, the fourth angle 45 is between about 20 degrees and about 30 degrees for both the roughing portion 34 and the finishing portion 32. In the illustrated embodiment, the fourth angle 45 is about 25 degrees.

In addition, a distance 31 from the cutting edge 20 to the back face 44 varies for both the finishing and roughing portions 32, 34 of the cutting insert 10. In the illustrated embodiment, the distance 31 between the cutting edge 20 and the bottom face 42 varies between about 0.045 inches (1.143 mm) to about 0.080 inches (2.032 mm). As shown in FIG. 2, the distance 31 from the cutting edge 20 to the back face 44 is shortest at ninety degree (90°) intervals around the perimeter of the cutting insert 10. It should be noted that the back face 44 is a sinusoidal waveform with a period 35 when viewed from the top of the cutting insert 10, as shown in FIG. 2. The period 35 of the back face 44 is larger than the period 33 of the second rake face 40. In the illustrated embodiment, the period 35 of the back face 44 is about five to six times larger than the period 33 of the second rake face 40.

Referring now to FIGS. 6-11, the cutting insert 10 will use almost half of the cutting edge 20 in the roughing portion 34 between AC during a contour/profile turning roughing machining operation of a workpiece 48. It will be appreciated that the cutting insert 10 will also use almost half of the cutting edge 20 in the finishing portion 32 between AC during a contour/profile turning finishing operation. In a profiling operation, the engagement of the round insert 10 and the workpiece 48 or the area of cut 50 is different during cutting, which gives different local depths of cut and feed due to the varying profile of the workpiece 48. One aspect of the invention is the sinusoidal variation of the distances 29, 31 that provides a continuously varying cross-sectional shape of the chipbreaker feature 30 between the finishing portion 32 (ABC) and the roughing portion 34 (ADC) of the cutting insert 10. As a result, the chipbreaker feature 30 guides and breaks the chip at different stages of the machining operation due to the varying engagement of the cutting insert 10 and the workpiece 48 as the cutting insert 10 moves along the workpiece 48.

As used herein, the feed rate is defined as the distance traveled by the workpiece 48 in one revolution of the workpiece 48. In an exemplary embodiment, the feed rate for a roughing operation is in a range between about 0.8 to about 1.4 mm/rev. For a finishing operation, the feed rate is in a range between about 0.2 to about 1.0 mm/rev.

As described above, a round cutting insert includes an asymmetric chipbreaker feature defined by a finishing portion, a roughing portion, and a transition portion therebetween. The cross-sectional shape of the chipbreaker feature continuously varies between the finishing portion and the roughing portion to allow the round cutting insert of the invention to be used for both finishing and roughing operations The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A round cutting insert for performing a machining operation on a workpiece, comprising:
   a bottom surface;
   a clearance side surface; and
   a top surface defining a cutting edge at an intersection between the clearance side surface and the top surface, the top surface including an asymmetric chipbreaker feature proximate the cutting edge, the asymmetric chipbreaker feature including a finishing portion, a roughing portion, and a transition portion located between the finishing portion and the roughing portion,
   wherein the asymmetric chipbreaker feature comprises a first rake face extending radially inward from the cutting edge to a second rake face, and
   wherein a distance from the cutting edge to the second rake face varies for both the finishing portion and the roughing portion of the cutting insert.

2. The round cutting insert according to claim 1, wherein the asymmetric chipbreaker feature further comprises a bottom face and a back face, and wherein the first rake face is formed at a first rake angle with respect to a plane perpendicular to a central axis of the cutting insert, and wherein the second rake face extends radially inward from the first rake face to the bottom face and is formed at a second rake angle with respect to the plane of the cutting insert, and wherein the bottom face extends radially inward from the second rake face to the back face and is formed at a third angle with respect to the plane of the cutting insert, and wherein the back face extends radially inward from the bottom face to a central island and is formed at a fourth angle with respect to the plane of the cutting insert.

3. The round cutting insert according to claim 1, wherein the distance is a sinusoidal variation.

4. A round cutting insert for performing a machining operation on a workpiece, comprising:
   a bottom surface;
   a clearance side surface; and
   a top surface defining a cutting edge at an intersection between the clearance side surface and the top surface, the top surface including an asymmetric chipbreaker feature proximate the cutting edge, the asymmetric chipbreaker feature including a finishing portion, a roughing portion, and a transition portion located between the finishing portion and the roughing portion,
   wherein the asymmetric chipbreaker feature comprises a first rake face, a second rake face and a bottom face, and wherein the first rake face extends radially inward from the cutting edge to the second rake face, and wherein the second rake face extends radially inward from the first rake face to the bottom face, and
   wherein a distance from the cutting edge to the back face varies for both the finishing portion and the roughing portion of the cutting insert.

5. The round cutting insert according to claim 4, wherein the distance is a sinusoidal variation.

6. A round cutting insert for performing a machining operation on a workpiece, comprising:
   a bottom surface;
   a clearance side surface; and
   a top surface defining a cutting edge at an intersection between the clearance side surface and the top surface, the top surface including an asymmetric chipbreaker feature proximate the cutting edge, the asymmetric chipbreaker feature including a finishing portion, a roughing portion, and a transition portion located between the finishing portion and the roughing portion,
   wherein the asymmetric chipbreaker feature comprises a first rake face extending radially inward from the cutting edge to a second rake face and is formed at a first rake angle with respect to a plane perpendicular to a central axis of the cutting insert, and
   wherein the first rake angle is smaller in the roughing portion of the asymmetric chipbreaker feature than in the finishing portion of the asymmetric chipbreaker feature.

7. The round cutting insert according to claim 2, wherein the second rake angle is between about fifteen degrees and about twenty degrees in both the roughing portion and the finishing portion.

8. The round cutting insert according to claim 2, wherein the third angle is about zero (0) degrees for both the roughing portion and the finishing portion.

9. The round cutting insert according to claim 2, wherein the fourth angle is between about twenty degrees and about thirty degrees for both the roughing portion and the finishing portion.

10. The round cutting insert according to claim 1, wherein the asymmetric chipbreaker feature has a continuously varying cross-sectional shape between the finishing portion and the roughing portion.

11. The round cutting insert according to claim 1, wherein the center island includes a plurality of indexing marks for indexing the cutting insert.

12. A round cutting insert for performing a machining operation on a workpiece, comprising:
    a bottom surface;
    a clearance side surface; and
    a top surface defining a cutting edge at an intersection between the clearance side surface and the top surface, the top surface including an asymmetric chipbreaker feature proximate the cutting edge, the asymmetric chipbreaker feature comprising a first rake face, a second rake face, a bottom face and a back face, the first rake face extends radially inward from the cutting edge to the second rack face and is formed at a first rake angle with respect to a plane perpendicular to a central axis of the cutting insert, and wherein the second rake face extends radially inward from the first rake face to the bottom face and is formed at a second rake angle with respect to the plane of the cutting insert, and wherein the bottom face extends radially inward from the second rake face to the back face and is formed at a third angle with respect to the plane of the cutting insert, and wherein the back face extends radially inward from the bottom face to a central island and is formed at a fourth angle with respect to the plane of the cutting insert,
    wherein a distance from the cutting edge to the second rake face is a sinusoidal variation with a first period, and
    wherein a distance from the cutting edge to the back face is a sinusoidal variation with a second period larger than the first period.

13. The round cutting insert according to claim 12, wherein the first rake angle is smaller in the roughing portion of the asymmetric chipbreaker feature than in the finishing portion of the asymmetric chipbreaker feature.

14. The round cutting insert according to claim 12, wherein the first rake angle is between about zero degrees and about five degrees in the roughing portion and between about five degrees and about ten degrees in the finishing portion.

15. The round cutting insert according to claim 12, wherein the second rake angle is between about fifteen degrees and about twenty degrees in both the roughing portion and the finishing portion.

16. The round cutting insert according to claim 12, wherein the third angle is about zero degrees for both the roughing portion and the finishing portion.

17. The round cutting insert according to claim 12, wherein the fourth angle is between about twenty degrees and about thirty degrees for both the roughing portion and the finishing portion.

18. The round cutting insert according to claim 12, wherein the asymmetric chipbreaker feature has a continuously varying cross-sectional shape between the finishing portion and the roughing portion.

19. The round cutting insert according to claim 12, wherein the center island includes a plurality of indexing marks for indexing the cutting insert.

* * * * *